May 6, 1958 P. S. E. FREDRIKSSON ET AL 2,833,110
MACHINES FOR MAKING CABLES
Filed Feb. 5, 1952 3 Sheets-Sheet 1

May 6, 1958   P. S. E. FREDRIKSSON ET AL   2,833,110
MACHINES FOR MAKING CABLES
Filed Feb. 5, 1952   3 Sheets-Sheet 2

May 6, 1958   P. S. E. FREDRIKSSON ET AL   2,833,110
MACHINES FOR MAKING CABLES
Filed Feb. 5, 1952   3 Sheets-Sheet 3
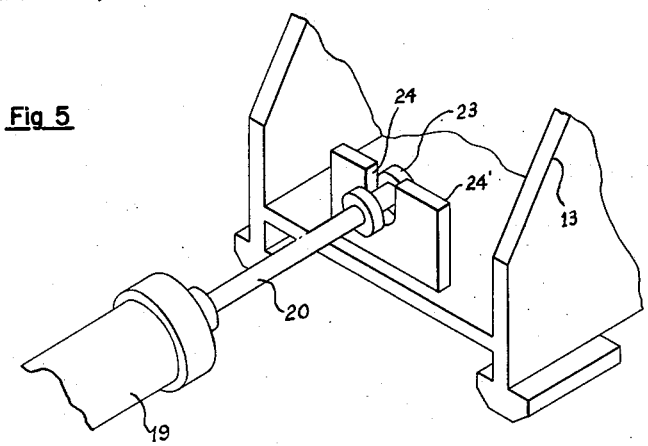
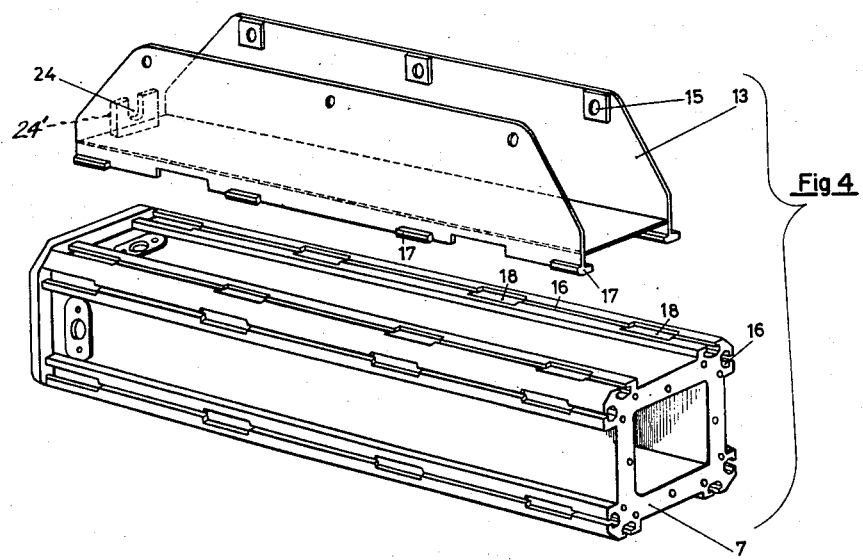

United States Patent Office 2,833,110
Patented May 6, 1958

2,833,110

MACHINES FOR MAKING CABLES

Per Sven Engelbrekt Fredriksson, Torsten Göran Emil Waenerlund, and Tore Sigfrid Schölin, Vasteras, Sweden, assignors to Aktiebolaget Svenska Metallverken, Vasteras, Sweden, a limited joint stock company of Sweden Application February 5, 1952, Serial No. 270,032

Claims priority, application Sweden February 8, 1951

6 Claims. (Cl. 57—14)

This invention relates to improvements in machines for making cables, preferably from wires, being of a material, possessing only a small elasticity, such as aluminium and copper.

The chief object of the invention is to provide a machine of this character, having easily changeable frames for bobbins.

A further object of the invention is to provide a machine of the said character having easily changeable frames, each one containing a plurality of bobbins.

A still further object of the invention is to provide a machine of the said character, wherein the bobbins are rotatably arranged on each one axis in frames containing a plurality of bobbins.

A still further object of the invention is to provide a machine of the said character having a rotating body or cage, on which the frames for the bobbins are mounted in an easily changeable way.

A still further object of the invention is to provide a machine of the said character wherein the frames are mounted on the cage in such a way that the axis of rotation of the bobbins remain essentially tangential to one or more imagined circular paths about the axis of rotation of the cage.

A still further object of the invention is to provide a machine of the said character, wherein the axis of rotation of all bobbins in each frame are located at the same distance from the axis of rotation of the cage.

A still further object of the invention is to provide a machine of the said character, wherein the cage consists of a central rotating body onto which the frames of the bobbins are peripherally arranged in an easily detachable engagement therewith.

A still further object of the invention is to provide a machine of the said character, wherein the rotating body is a casting.

A still further object of the invention is to provide a machine of the said character, wherein the rotating body, being preferably a casting, presents fixing members adapted to fit corresponding fixing members on the frames in order to bring the cage and the frames into an easily detachable engagement.

With the above and other objects in view, the invention consists of certain novel features of construction, combination and arrangement of parts, as will be hereinafter described and claimed.

In the accompanying drawings:

Fig. 1a diagrammatically illustrates in a side view a portion of a machine for making cable, constructed in accordance with the invention.

Fig. 1b is a continuation of Fig. 1a and diagrammatically illustrates in side elevation another portion of the machine shown in Fig. 1a.

Fig. 2 is a vertical cross-sectional view on the line 2—2 of Fig. 1a.

Fig. 4 is a perspective view of the rotating body together with a frame placed at a distance therefrom, showing particularly a preferred device for mounting the frame on the rotating body.

Fig. 5 is a fragmentary perspective view to an enlarged scale showing the relationship between the piston and frame.

Figure 1A:
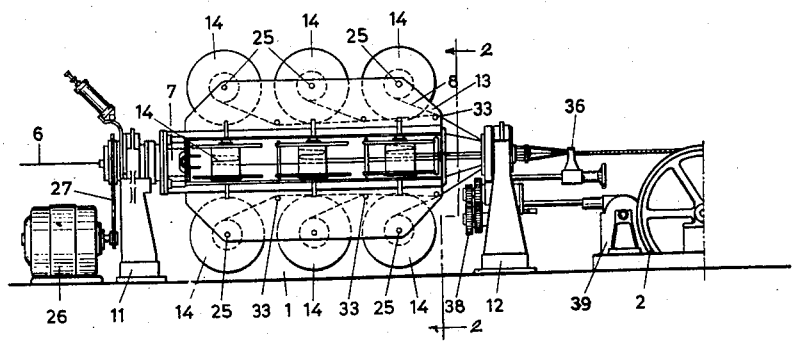

Referring more particularly to the drawing the cable machine according to the invention is generally designated by 1. Reference numeral 2 designates the draw-off capstan, 3 the registering device for the reeling of the cable and 4 the reel upon which the cable 5 formed is being spooled. Designated by 6 is the core, which is fed through the hollow centre of the machine-body 7, and by 8 one of the wires leaving the bobbins of the machine.

Figure 1B:
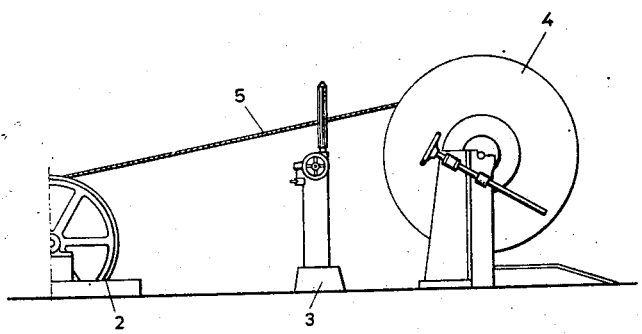
Figure 2:
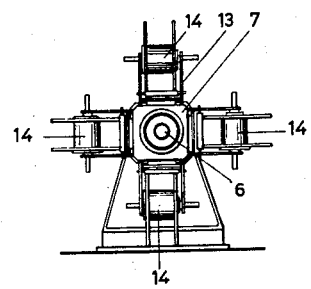
Figure 3:
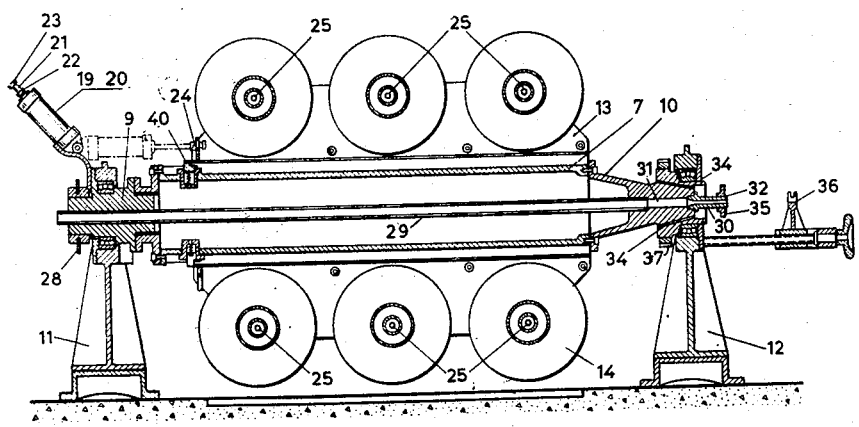
Fig. 3 is an enlarged side view of the rotating body or cage of the machine showing the frames and bobbins in mounted position.

The machine-body 7 is pivotally supported by means of taps 9 and 10 in pedestals 11 and 12 respectively. With reference to Figs. 1–3 four frames 13 are mounted on the machine-body, each one of said frames containing three bobbins 14. The spindles 25 of the bobbins extend for instance through holes 15 in the frames (Fig. 4).

The machine-body 7, frames 13 and bobbins 14 as a unit are set in rotation about an axis of rotation passing through the taps 9 and 10, from an electric motor 26 over a sprocket chain 27, engaging a sprocket gear 28, which is located on the outer end of the tap 9.

In operation of the machine according to the invention the core 6 is continuously fed through an inner pipe 29, shown in Fig. 3 and leaves the machine-body through a sleeve 30 inserted in a bore 31 in the tap 10, said sleeve having secured thereto at its outermost end a die plate 32. The wire 8 leaving each bobbin 14 is led over a guide pulley 33 through a bore 34 in the tap 10 and thereafter through one of the holes 35 in the die plate 32, from which all wires 8 converge to enter a closing device together with the core 6. In rotating the machine-body and all details attached thereto, the wires 8 are stranded upon the core 6 after leaving the die plate 32, the pitch obtained being determined by the ratio between the speeds of the machine-body and the draw-off capstan 2. In order to permit alteration of said ratio and consequently of the pitch, the capstan 2 is driven from the electric motor 26 via a gear 37 secured to the tap 10 and a suitable reduction gearing generally designated by 38 and a worm gearing 39.

One of the most outstanding difficulties encountered in producing cables, using machines for this purpose known hitherto is the changing of the bobbins, after they have been emptied. As a matter of fact in known constructions the bobbins are built in a big cage and placed in special frames, which are relatively inaccessible per se and permit removal and substitution only with great difficulties. Furthermore the bobbins have to be removed or changed one by one which involves on one hand great efforts and on the other hand time consumption which will in turn result in stops in operation for long periods of time.

To avoid the above difficulties the invention has for its purpose to provide a cable producing machine in which the bobbins are easily and rapidly changeable. Further the invention has for its purpose to render possible the changing of a plurality of bobbins in a single operation. A further object is to provide a machine in which the bobbins are better protected and less available to accidental impacts in relation to the conventional machines. This is obtained according to the invention by placing at least two but even more bobbins in a common frame, all frames being detachably fixed to the rotating cage of the machine so as to permit easy and rapid changing of the frames.

To this end the cage is given the shape of a central, relatively compact revoluble body onto which the different frames are peripherally fixed so as to permit easy and rapid changing thereof and to promote the accessibility of the bobbins.

According to the invention the revoluble body may be constructed as a frame work or similar construction but it is preferred to be in the form of a casting, which offers high strength and makes the mounting of the frames easier. By utilizing a casting as a revoluble body the frame mounting or supporting surfaces of the body may be arbitrarily shaped to suit the purpose since in manufacture thereof no considerable surplus work has to be laid down upon it if its shape is made relatively complicated.

The frames should mostly be angularly equally spaced about the periphery of the body, and by giving the latter a cross sectional shape essentially of an equilateral polygon, i. e. a square, the different frames may be mounted on the different sides thus obtained. It is not necessary to make the body in the shape of a polygon. For instance a body of another shape may be used, such as of circular shape, but then it is preferable to provide special frame-supporting plans upon the periphery of the body and as a mater of fact these plans will generally be located in plans corresponding to the sides of the above polygon.

The shape of the body also contributes to simplify and improve the construction of the frames. The latter may thus be formed essentially as boxes or the like having outwardly extending gables.

The box-shape is to be preferred since it may be obtained simply by assembling plain sheets or by bending a plate so as to provide the outwardly extending gables, carrying the spindles of the bobbins of each frame. Such gables per se also provide better strength than the legs of separate yokes.

Fig. 4 more closely illustrates a preferred device for mounting the frame on the machine-body in a simple and easily changeable way.

As seen from the figure the machine-body is externally provided with dovetail or equivalently shaped slots 16, whereas the frame is equipped with a suitable number of knobs 17. Furthermore the dovetail slots are provided with pockets 18 of the same number and at least of the same length as the knobs 17. The pockets are, however, placed in such a way longitudinally of the slots 16, that, if the frame is inserted with the knobs into the pockets, the frame has to be slid before reaching its ultimate position for the cable producing operation. After being slid to its ultimate operative position the frame is locked in this position in any adequate way.

The displacement per se of the frame may, according to the invention, be carried out for instance by using a cylinder 19, which is hingedly attached to the bearing pedestal 11 and in which a pressure actuated piston 20 operates. At its external, free end 21 the piston is provided with two shoulders 22, 23. When the piston is lowered towards the frame, the said end of the piston is grasped in a slot 24 in a plate 24' located on the frame (Fig. 4) so that the shoulders 22, 23 will be placed at each side of the plate. Consequently the frame is retained in relation to the piston due to the fact that the shoulders, being wider than the slot, abut the plate when the frame or piston is displaced. In Fig. 3 the piston is shown in dotted lines in a folded-down position in which it will cooperate with the frame in the above described manner. This relationship is shown on an enlarged scale in Fig. 5.

The means referred to above for locking the frame to the machine body may be formed in different ways. In Fig. 3 a spring actuated bolt is indicated at 40, which is mounted in the machine body and the head of which will enter a hole in the frame, when the latter is slid into working position.

A special advantage of the invention is, as indicated above, that the frames may be used at the winding of the wires on the bobbins, the corresponding principle being used in the winding machine as in the cable producing machine. Thereby the capacity of the winding machine is increased.

The invention, however, is not limited to the embodiment shown but may be varied in several respects within the scope of the basic inventive idea. Thus the number of frames may not for instance be four, but six and eight or another number may be used. Also the number of bobbins in the frames may be varied depending upon the number of wires to be stranded.

The present invention is particularly advantageous for stranding wires of material possessing relatively slight elasticity, such as copper and aluminum, enabling a core of steel to be used about which the wires are stranded.

The invention is, however, not limited to the stranding of cables made of wires of such materials but may be utilized to produce stranded cables of other materials.

Having now described the invention, what we claim as new and desire to secure by Letters Patent, is:

1. A cable stranding machine comprising a rotatably mounted central body, a plurality of frames, each of said frames having rotatably mounted thereon a plurality of bobbins for cable strands, and fastening means providing quick-detachable connections for separately mounting each of said frames on said central body.

2. A machine as defined in claim 1 in which said frames are movable relative to said central body from a first position in which said fastening means is disengaged to a second position in which said fastening means is engaged.

3. A machine as defined in claim 2 including actuating means detachably engaging said frames for selectively moving any selected frame from said first position to said second position and vice versa.

4. A machine as defined in claim 3 in which said actuating means comprises a fluid pressure actuated cylinder and piston assembly movably mounted on the machine to permit selective engagement thereof with any desired one of said frames to move the frame from one to the other of said positions.

5. A machine as defined in claim 2 in which said fastening means comprises projections and recesses on the respectively movable parts.

6. A machine as defined in claim 1 in which said frames comprise elongated structures having base and side portions between which said bobbins are mounted, and in which said frames are movable relative to said central body longitudinally of the axis of rotation of the machine to effect engagement or disengagement of said quick-detachable fastening means.

References Cited in the file of this patent

UNITED STATES PATENTS

| | | |
|---|---|---|
| 585,070 | Yeakel | June 22, 1897 |
| 630,334 | Dodd | Aug. 8, 1899 |
| 887,277 | Shinn | May 12, 1908 |
| 1,403,123 | Leedy | Jan. 10, 1922 |
| 1,405,554 | Northcraft | Feb. 7, 1922 |
| 1,823,886 | Clark | Sept. 22, 1931 |
| 2,079,873 | Reed | May 11, 1937 |
| 2,156,652 | Harris | May 2, 1939 |
| 2,615,297 | Haythornthwaite | Oct. 28, 1952 |

FOREIGN PATENTS

| | | |
|---|---|---|
| 155,797 | Germany | Nov. 4, 1904 |
| 476,863 | Great Britain | Dec. 16, 1937 |